United States Patent [19]

Ziegler et al.

[11] Patent Number: 5,210,166

[45] Date of Patent: May 11, 1993

[54] COPOLYMERS OF ETHYLENE WITH POLYALKYLENE GLYCOL (METH)ACRYLATES

[75] Inventors: Walter Ziegler, Edingen-Neckarhausen; Horst Koch, Grosskarlbach, both of Fed. Rep. of Germany

[73] Assignee: BASF Aktiengesellschaft, Ludwigshafen, Fed. Rep. of Germany

[21] Appl. No.: 253,896

[22] Filed: Oct. 5, 1988

Related U.S. Application Data

[63] Continuation of Ser. No. 927,394, Nov. 6, 1986, abandoned.

[30] Foreign Application Priority Data

Nov. 7, 1985 [DE] Fed. Rep. of Germany ....... 3539469

[51] Int. Cl.$^5$ ..................... C08F 212/00; C08F 18/00
[52] U.S. Cl. .............................. 526/307.5; 526/318.45; 526/320; 526/348.8
[58] Field of Search ................... 526/320, 348.8, 307.5, 526/318.45

[56] References Cited

U.S. PATENT DOCUMENTS

| | | | |
|---|---|---|---|
| 2,570,861 | 10/1951 | Roedel | 526/320 |
| 2,892,783 | 6/1959 | Stuart et al. | 526/320 |
| 2,892,820 | 6/1959 | Stewart et al. | 526/320 |
| 2,998,414 | 8/1961 | West et al. | 526/320 |
| 3,201,374 | 8/1965 | Simms | 526/318.45 |
| 3,215,657 | 11/1965 | Beresniewicz et al. | 526/318.45 |
| 3,542,749 | 11/1970 | Anspon et al. | 526/329 |
| 3,719,647 | 3/1973 | Hardy et al. | 260/86.1 R |
| 3,988,509 | 10/1976 | Bullard et al. | 526/329 |
| 4,065,613 | 12/1977 | Logothetis | 526/292 |
| 4,472,455 | 9/1984 | Kohl et al. | 427/48 |

FOREIGN PATENT DOCUMENTS 0114340 12/1983 European Pat. Off. .
0043319 4/1984 European Pat. Off. .
1423633 2/1976 United Kingdom .

OTHER PUBLICATIONS

E. H. Riddle Reinhold Pub. Co. 1954 Monomeric Acrylic Esters pp. 90–92.

*Primary Examiner*—Thurman K. Page
*Assistant Examiner*—Peter F. Kulkosky
*Attorney, Agent, or Firm*—Keil & Weinkauf

[57] ABSTRACT

Novel copolymers of ethylene with ω-alkyl-, -cycloalkyl- or -aryl-poly-(alkylene oxide)-α-yl (meth)acrylates and, if required, α,β-ethylenically unsaturated carboxylic acids, carboxamides or carboxylic anhydrides and, if desired, further monomers which are copolymerizable with ethylene, selected from the classes consisting of the vinyl esters, vinyl ethers and/or (meth)acrylates.

6 Claims, No Drawings

COPOLYMERS OF ETHYLENE WITH POLYALKYLENE GLYCOL (METH)ACRYLATES

This application is a continuation of application Ser. No. 927,394, filed on Nov. 6, 1986, now abandoned.

The present invention relates to copolymers of ethylene, consisting of a) from 30 to 80 parts by weight of ethylene,
b) from 2 to 40 parts by weight of a (meth)acrylate,
c) from 0 to 40 parts by weight of an $\alpha,\beta$-ethylenically unsaturated carboxylic acid, a carboxylic anhydride or a carboxamide and
d) if required, one or more further olefinically unsaturated comonomers which are copolymerizable with ethylene and differ from (b) and (c).

Such copolymers of ethylene are high molecular weight substances whose properties are essentially determined by the comonomer content and which are useful as hot melt adhesives, adhesion promoters and antidrumming compounds, as additives to thermoplastics, synthetic rubbers, asphalt and adhesive and coating systems, and as materials for absorbing mechanical shocks.

It is known that ethylene can be polymerized with $\alpha,\beta$-ethylenically unsaturated carboxylic acids, carboxylic anhydrides or carboxamides in the presence or absence of one or more further olefinically unsaturated comonomers which are copolymerizable with ethylene to give the corresponding ethylene copolymers (cf. for example EP-A1-98 488, 106 999 and 115 190 or DE-A-23 41 462). The products have very different properties, depending on their composition; for example, they can be used for the preparation of ionomers having improved low temperature properties.

It is an object of the present invention to provide ethylene copolymers which have elastomeric properties, are stable to ozone and at the same time are soluble or swellable in an aqueous medium.

We have found that this object is achieved, according to the invention, by ethylene copolymers as claimed in claims 1 to 6.

The novel copolymers consist of from 30 to 80, preferably from 40 to 60, parts by weight of copolymerized ethylene, from 2 to 40, preferably from 20 to 40, parts by weight of a (meth)acrylate of the general formula (I), from 0 to 40, preferably from 1 to 40, in particular from 8 to 30, parts by weight of an $\alpha,\beta$-ethylenically unsaturated carboxylic acid, an ethylenically unsaturated carboxylic anhydride or an ethylenically unsaturated carboxamide and, if required, one or more further olefinically unsaturated comonomers which are copolymerizable with ethylene and differ from the compounds defined above, preferably in amounts of from 10 to 30, in particular from 10 to 25, parts by weight. The copolymers according to the invention have melt flow indices of less than 1000, preferably from 10 to 800, in particular from 50 to 500, g/10 min, measured according to DIN 53,735 at 190° C. and under a load of 2.16 kp. The ethylene copolymers are elastomeric and have Shore A hardnesses according to DIN 53,505 of $\geq 20$. They are soluble or at least dispersible in aqueous media and are substantially stable to the action of ozone.

Monomer ethylene (a) present in the copolymer is such a well known copolymer component that no further description is required (cf. also Encyclopedia of Polymer and Technology, vol. 6, Ethylene Polymers-Polar Copolymers, pages 387–431, John Wiley & Sons [1967]).

The (meth)acrylate component (b) in the ethylene copolymer is of the general formula (I)

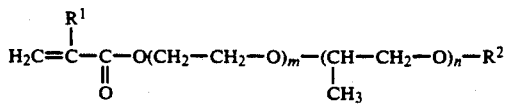

where $R^1$ is H or $CH_3$, $R^2$ is alkyl, cycloalkyl or aryl, and m and n are each $\geq 0$, with the proviso that the sum of m and n is always greater than 2. M is preferably from 2 to 100, particularly preferably from 2 to 50, in particular 11, while n is preferably from 0 to 100, particularly preferably from 0 to 50. Particularly suitable $\omega$-alkyl-, -cycloalkyl- or -aryl-poly-(alkylene oxide)-$\alpha$-yl (meth)-acrylates of the general formula I are those in which $R^2$ is $CH_3$, $C_2H_5$, $C_3H_7$, $C_4H_9$, $C_{16}H_{33}$, $C_6H_{11}$ or $C_6H_5$. A very particularly preferably used $\omega$-methyl-poly-(ethylene oxide)-$\alpha$-yl acrylate is one which has the following composition (II):

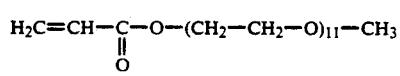

The poly-(alkylene glycol) acrylates and methacrylates are conventional comonomer components, particularly with acrylic acid and/or alkyl acrylates (cf. EP-A2-114 340, DE-A-23 30 328, EP-A1-43 319, US-A-37 19 647, GB-A-1 423 633 or DE-A-24 54 946). The unsaturated poly-(ethylene glycol) acrylates can be obtained, for example, by reacting the corresponding acyl chlorides with polyethylene glycol (cf. DD-A-129 778).

$\alpha,\beta$-Ethylenically unsaturated carboxylic acids, carboxylic anhydrides or carboxamides which may be present in the ethylene copolymer as component (c) are understood as being, in particular, the derivatives of unsaturated carboxylic acids, or these acids themselves, preferably of 3 to 8 carbon atoms. These are the conventional carboxylic acids which are copolymerizable with ethylene, eg. acrylic acid, methacrylic acid, itaconic acid, maleic acid or fumaric acid, acrylamide, methacrylamide, maleic anhydride and methyl hydrogen maleate. The carboxylic acid may also be formed by comonomers (c) which are converted during or after the copolymerization by hydrolysis and/or pyrolysis, for example by copolymerized tert-butyl acrylate. Ethylene copolymers which contain an $\alpha,\beta$-ethylenically unsaturated carboxylic acid, a carboxylic anhydride or a carboxamide as copolymerized units are well known from the Literature (cf. for example DE-A-28 02 866, 27 17 411, US-A-3 997 455, 35 01 540, DE-A-26 23 006, US-A-3 827 997 or DE-A-25 24 274).

The copolymers can, if required, also contain, as copolymerized units, one or more further olefinically unsaturated comonomers (d) which are copolymerizable with ethylene and differ from the above monomers. Particularly suitable comonomers (d) are vinyl esters of the general formula

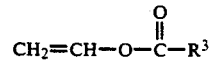

where $R^3$ is $C_1$–$C_{10}$-alkyl, vinyl ethers of the general structure $CH_2=CH-OR^3$, where $R^3$ is $C_1$–$C_{10}$-alkyl, (meth)acrylates of the general structure

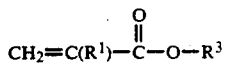

$$CH_2=C(R^1)-\overset{\overset{O}{\|}}{C}-O-R^3$$

where $R^1$ is H or $CH_3$ and $R^3$ is $C_1$–$C_{10}$-alkyl, and other monomers. Particularly suitable comonomers (d) are vinyl acetate, vinyl propionate, vinyl butyrate, vinyl valerate, vinyl hexanecarboxylate, vinyl ethyl ether, vinyl prop-1-yl ether, vinyl prop-2-yl ether, vinyl but-1-yl ether, vinyl but-2-yl ether, vinyl pent-1-yl ether, methyl acrylate, ethyl acrylate, ethyl methacrylate, propyl acrylate, propyl methacrylate, n-butyl acrylate, n-butyl methacrylate, n-pentyl acrylate, n-pentyl methacrylate, n-hexyl acrylate, n-hexyl methacrylate, tert-butyl acrylate, cyclohexyl acrylate, cyclohexyl methacrylate, 2-ethylhexyl acrylate and 2-ethylhexyl methacrylate. Other monomers (d) which are copolymerizable with ethylene, possess low glass transition temperatures as homopolymers and belong to the class consisting of the vinyl esters, vinyl ethers or (meth)acrylates are also suitable elastifying components. They are described in the chapter entitled The Glass Transition Temperature of Polymers in Polymer Handbook second edition, J. Brandrup and E. H. Immergut, etc., J. Wiley and Sons, New York, 1975.

Particularly suitable comonomers (d) are vinyl acetate, n-butyl acrylate, 2-ethylhexyl acrylate and vinyl but-1-yl ether. The copolymerization of these comonomers with ethylene and, if appropriate, with acrylic acid forms part of the prior art (cf. for example DE-A-28 02 866, GB-A-1 148 148, US-A-4 157 428 or EP-A-12 368).

Preferred copolymers are terpolymers which contain, as copolymerized units, not only ethylene and the (meth)-acrylate of the general formula (I) but also the comonomer component (c), ie. an $\alpha,\beta$-ethylenically unsaturated carboxylic acid, unsaturated carboxylic anhydride or carboxamide, in the claimed amount, acrylic acid and methacrylic acid being particularly preferred as component (c). A particularly preferred ethylene copolymer is a terpolymer of ethylene, a (meth)acrylate (II) and acrylic acid or methacrylic acid in the claimed amounts, in particular containing from 8 to 30 parts by weight of copolymerized acrylic acid or methacrylic acid.

The novel ethylene copolymers can be prepared by conventional high pressure polymerization methods [cf. Ullmans Enzyklopädie der technischen Chemie, 4th edition, volume 19 (1980), pages 169–175, Verlag Chemie GmbH, D-6940 Weinheim]. The copolymerization of ethylene is carried under from 350 to 5000, preferably from 1500 to 3000, bar. In preparing the novel copolymers of ethylene, the process is carried out in particular under from 2000 to 3000 bar. The temperatures in the polymerization system are from 50° to 450° C., preferably from 150° to 350° C. The conditions in the polymerization system can be established in tube reactors or autoclaves. Tube reactors are tubular polymerization vessels whose length is more than 2000 times, preferably from 5000 to 50,000 times, the tube diameter. Some of the heat of polymerization is removed in a conventional manner by cooling the tube reactor externally with water. Autoclaves are pressure vessels which have a length/diameter ratio of from 1 to about 20. Autoclave reactors are particularly useful for the preparation of the novel copolymers of ethylene. The copolymerization of ethylene, for example with (meth)acrylic acid and an $\omega$-alkyl-, cycloalkyl- or aryl-poly-(alkylene oxide)-$\alpha$-yl (meth)acrylate (I) and, if required, the further comonomers from the classes consisting of vinyl esters, vinyl ethers and/or (meth)acrylates, is carried out in the presence of a free radical initiator. Free radical initiators are catalysts which are also used for the homopolymerization of ethylene under high pressure. An example of a suitable initiator is oxygen, which is advantageously used in an amount of from 10 to 200 mol ppm, based on the ethylene to be polymerized. Other suitable initiators are peroxides and other free radical-forming compounds, as well as mixtures of peroxides which have different decomposition temperatures, and hydroperoxides, especially mixtures of oxygen and peroxides and-/or hydroxides. Examples of peroxides and hydroperoxides are tert-butyl perpivalate, di-tert-butyl peroxide, tert-butyl hydroperoxide, tert-butyl perbenzoate, dilauroyl peroxide and tert-butyl perisononanoate. Other free radical polymerization initiators are compounds such as azoisobutyronitrile. It is also possible to use mixtures of oxygen and one or more peroxides. Peroxides such as di-tert-butyl peroxide, tert-butyl perpivalate and tert-butyl perisononanoate are particularly useful.

The molecular weight of the copolymer obtained can be brought to the desired value by means of the conventional regulators, for example hydrocarbons, such as propane, propene, etc, ketones, such as acetone, methyl ethyl ketone, etc, or aldehydes, such as propionaldehyde. The last-mentioned compound is particularly suitable.

The copolymerization is generally carried out in the absence of a solvent. The small amounts of an inert solvent, such as benzene, mineral oils and other inert solvents, in which the polymerization initiators are dissolved are negligible compared with the other starting materials. If oxygen is used as the polymerization initiator, solvents can be completely dispensed with.

The advantages of the invention are that is provides novel ethylene copolymers which have elastomeric properties, are stable to ozone and at the same time are soluble or swellable in aqueous media.

EXAMPLE 1

A mixture of 12.5 kg/h of ethylene, 1.23 kg/h of acrylic acid, 1.29 kg/h of $\omega$-methyl-poly-(ethylene oxide)-$\alpha$-yl acrylate of the formula (II) and 0.016 kg/h of propionaldehyde was passed continuously through a 1 liter stirred autoclave kept under 1800 bar. By continuously adding 31.7 g/h of tert.-butyl perpivalate dissolved in isododecane, the temperature in the autoclave was maintained at 210° C. After the reaction mixture had been let down, 3.6 kg/h of an ethylene/acrylic acid/$\omega$-methyl-poly-(ethylene oxide)-$\alpha$-yl acrylate terpolymer containing 17.6% by weight of acrylic acid and 25% by weight of $\omega$-methyl-poly-(ethylene oxide)-$\alpha$-yl acrylate were obtained. The melt flow index, measured at 190° C. and under a load of 2.16 kp, was 250 g/10 minutes.

EXAMPLE 2

A mixture of 200 kg/h of ethylene, 8.4 kg/h of acrylic acid, 5.7 kg/h of $\omega$-methyl-poly-(ethylene oxide)-$\alpha$-yl acrylate of the formula (II) and 9.4 kg/h of n-butyl acrylate was passed continuously at 88° C. through a 10 liter stirred autoclave which had a length/diameter ratio of 13:1 and was kept under 2300 bar. The reaction mixture was metered into the center of the autoclave. By continuously adding 87 g/h of tert-butyl perpivalate dissolved in isododecane, the maximum temperature in the autoclave was kept at 218° C. After the reaction mixture had been let down, the polymer was obtained in an amount of 36 kg/h, corresponding to a conversion of 19.0% by weight, based on ethylene throughput. The polymer was composed of 53.1% by weight of ethylene, 15.4% by weight of acrylic acid, 12% by weight of ω-methyl-poly-(ethylene oxide)-α-yl acrylate of the formula (II) and 19.5% by weight of n-butyl acrylate. It had a melt flow index of 150 g/10 minutes, measured according to DIN 53,735 at 190° C. and under a load of 2.16 kp.

wherein the (meth)acrylate (b) is an ω-alkyl-, -cycloalkyl- or -aryl-poly-(alkylene oxide-α-yl (meth)-acrylate of the formula (I)

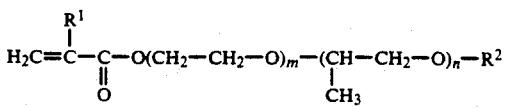

where $R^1$ is H or $CH_3$, $R^2$ is alkyl, cycloalkyl or aryl and m and n are each equal to or greater than 0, with the proviso that the sum of m and n is always equal to or greater than 2.

2. A terpolymer as defined in claim 1, wherein, in the (meth)acrylate of the formula (I), m is from 2 to 100 and n is from 0 to 100.

3. A terpolymer as defined in claim 1, wherein, in the (meth)acrylate of the formula (I), m is from 2 to 50 and n is from 0 to 50.

4. A terpolymer as defined in claim 1, wherein, in the (meth)acrylate of the formula (I), $R^2$ is $CH_3$, $C_2H_5$, $C_3H_7$, $C_4H_9$, $C_{16}H_{33}$, $C_6H_{11}$ or $C_6H_5$.

5. A copolymer as claimed in claim 1 wherein component C) is from 8 to 30 parts by weight of an α,β-ethylenically unsaturated carboxylic acid, a carboxylic anhydride or a carboxamide.

6. A copolymer of ethylene as claimed in claim 5, which contains from 8 to 30 pars by weight of acrylic acid or methacrylic acid as copolymerized units.

TABLE 1

| Example No. | Pressure (bar) | Tmax (°C.) | Tmin (°C.) | Ethylene through-put (kg/h) | Amount of comonomer metered in | | | Initiator TBPPI (g/h) | Regulator PA (kg/h) |
|---|---|---|---|---|---|---|---|---|---|
| | | | | | AA (kg/h) | Compound II (kg/h) | EHA (kg/h) | | |
| 3 | 2300 | 218 | 90 | 217 | 8.7 | 3.7 | 8.1 | 47.8 | 0.15 |
| 4 | 2300 | 220 | 91 | 202 | 11.8 | 4.9 | 10.8 | 72.8 | 0.15 |

| Example No. | Production (kg/h) | Conversion (%) | Comonomer content | | | MFI 190/2.16 (g/10') |
|---|---|---|---|---|---|---|
| | | | AA (% by weight) | Compound II (% by weight) | EHA (% by weight) | |
| 3 | 36 | 16.6 | 15.7 | 7.5 | 17 | 85 |
| 4 | 39 | 19.3 | 19.1 | 9 | 20 | 270 |

E = ethylene
AA = acrylic acid

Compound II = $H_2C\!=\!CH\!-\!\underset{\underset{O}{\|}}{C}\!-\!O\!-\!(CH_2\!-\!CH_2\!-\!O)_{11}\!-\!CH_3$ EHA = 2-ethylhexyl acrylate
TBPPI = tert-butyl perpivalate
PA = propionaldehyde
nBA = n-butyl acrylate

TABLE 2

| Example No. | Composition | | | | | MFI 190/2.16 (g/10') | Shore A hardness (DIN 53,505) | Glass transition temperature (°C.) (DSC) | Solubility, 0.5% by weight NaOH, 60° C. |
|---|---|---|---|---|---|---|---|---|---|
| | E (% by weight) | AA (% by weight) | II (% by weight) | nBA (% by weight) | EHA (% by weight) | | | | |
| 1 | 57.4 | 17.6 | 25 | — | — | 250 | 35 | −42 | dissolved |
| 2 | 53.1 | 15.4 | 12 | 19.5 | — | 150 | 35 | −35 | dissolved |
| 3 | 59.8 | 15.7 | 7.5 | — | 17 | 85 | 58 | −28 | pronounced swelling |
| 4 | 51.9 | 19.1 | 9 | — | 20 | 270 | 33 | −29 | dissolved |

We claim:

1. A terpolymer of ethylene prepared by a high pressure polymerization process, having a melt flow index of from 50 to 500 g/10 min and a Shore A hardness according to German Industrial Standard (DIN) 53,505 of 20 and which is soluble or swellable in an aqueous medium, comprising
   a) from 40 to 60 parts by weight of ethylene,
   b) from 2 to 40 parts by weight of a (meth)acrylate,
   c) from 1 to 40 parts by weight of an α-β-ethylenically unsaturated carboxylic acid, a carboxylic anhydride or a carboxamide and

UNITED STATES PATENT AND TRADEMARK OFFICE
CERTIFICATE OF CORRECTION

PATENT NO. : 5,210,166

DATED : May 11, 1993

INVENTOR(S) : ZIEGLER et al.

It is certified that error appears in the above-identified patent and that said Letters Patent is hereby corrected as shown below:

Column 6, line 59, claim 6, "pars" should be --parts--

Signed and Sealed this

Fourth Day of January, 1994

Attest:

BRUCE LEHMAN

Attesting Officer     Commissioner of Patents and Trademarks